(12) United States Patent
Yim

(10) Patent No.: US 11,030,611 B2
(45) Date of Patent: Jun. 8, 2021

(54) SHORT-RANGE PAYMENT SYSTEM USING SOUND COMMUNICATION

(71) Applicants: DANSOLPLUS CO., LTD., Seoul (KR); Chang Soon Yim, Seoul (KR)

(72) Inventor: Chang Soon Yim, Seoul (KR)

(73) Assignees: DANSOLPLUS CO., LTD., Seoul (KR); Chang Soon Yim, Seoul (KR)

( * ) Notice: Subject to any disclaimer, the term of this patent is extended or adjusted under 35 U.S.C. 154(b) by 37 days.

(21) Appl. No.: 16/316,806

(22) PCT Filed: Aug. 20, 2018

(86) PCT No.: PCT/KR2018/009527
§ 371 (c)(1),
(2) Date: Jan. 10, 2019

(87) PCT Pub. No.: WO2019/078467
PCT Pub. Date: Apr. 25, 2019

(65) Prior Publication Data
US 2019/0362336 A1 Nov. 28, 2019

(30) Foreign Application Priority Data

Oct. 20, 2017 (KR) .......................... 10-2017-0136567

(51) Int. Cl.
*G06Q 20/32* (2012.01)
*G06Q 20/40* (2012.01)
*H04L 9/08* (2006.01)

(52) U.S. Cl.
CPC ....... *G06Q 20/3272* (2013.01); *G06Q 20/401* (2013.01); *H04L 9/0861* (2013.01); *G06Q 2220/00* (2013.01); *H04L 2209/56* (2013.01)

(58) Field of Classification Search
CPC ............ G06Q 20/3272; G06Q 20/401; G06Q 20/325; G06Q 2220/00; G06Q 20/327;
(Continued)

(56) References Cited

U.S. PATENT DOCUMENTS 6,999,948 B1 * 2/2006 Hatanaka ................ G06F 21/10
380/200
7,203,312 B1 * 4/2007 Hatanaka ............ H04L 63/0428
380/201
(Continued)

FOREIGN PATENT DOCUMENTS

EP 2624616 A1 * 8/2013 ............ H04W 76/10
KR 10-2014-0088005 A 7/2014
(Continued)

OTHER PUBLICATIONS

S. Mei, Z. Liu, Y. Zeng, L. Yang and J. F. Ma, "Listen!: Audio-based Smart IoT Device Pairing Protocol," 2019 IEEE 19th International Conference on Communication Technology (ICCT), Xi'an, China, 2019, pp. 391-397, doi: 10.1109/ICCT46805.2019.8947178. (Year: 2019).*

(Continued)

*Primary Examiner* — Mamon Obeid
*Assistant Examiner* — Jahed Ali
(74) *Attorney, Agent, or Firm* — Paratas Law Group, PLLC

(57) ABSTRACT

A short-range payment system according to an embodiment of the present invention may include: a user terminal configured to transmit and receive a card information sound wave signal, which is a sound wave signal including card information, during operation in payment mode; a magnetic field converter configured to, when receiving the card information sound wave signal, extract the card information from the card information sound wave signal and generate a magnetic field that matches the extracted card information; and an MST payment device configured to perform payment processing by using the magnetic field generated by the magnetic field converter.

6 Claims, 8 Drawing Sheets

(58) Field of Classification Search
CPC ............ G06Q 20/3278; G06Q 20/353; G06Q 20/382; H04L 9/0861; H04L 2209/56; H04L 9/3226; H04L 9/3215; H04L 2209/805; G06K 19/06206; G06K 19/0727; H04W 12/003; H04W 12/00504; H04W 12/04071; H04W 4/80
See application file for complete search history.

(56) References Cited

U.S. PATENT DOCUMENTS

| | | | | |
|---|---|---|---|---|
| 10,181,926 | B2* | 1/2019 | Kim | G06K 19/06 |
| 2002/0013884 | A1* | 1/2002 | Fujioka | G06F 9/445 |
| | | | | 711/115 |
| 2002/0194137 | A1* | 12/2002 | Park | G06Q 20/10 |
| | | | | 705/64 |
| 2006/0173790 | A1* | 8/2006 | Park | G07B 15/063 |
| | | | | 705/13 |
| 2009/0043681 | A1* | 2/2009 | Shoji | G06F 21/335 |
| | | | | 705/35 |
| 2009/0267729 | A1* | 10/2009 | Rowe | G06K 19/07381 |
| | | | | 340/5.8 |
| 2012/0151515 | A1* | 6/2012 | Atsmon | G06F 21/34 |
| | | | | 725/23 |
| 2012/0214416 | A1* | 8/2012 | Kent | H04W 4/21 |
| | | | | 455/41.2 |
| 2013/0091359 | A1* | 4/2013 | Guo | H04L 63/162 |
| | | | | 713/171 |
| 2013/0275881 | A1* | 10/2013 | Hahm | H04W 4/021 |
| | | | | 715/752 |
| 2014/0076967 | A1* | 3/2014 | Pushkin | G06Q 20/3272 |
| | | | | 235/380 |
| 2014/0203082 | A1* | 7/2014 | Huh | G06K 7/082 |
| | | | | 235/440 |
| 2015/0304285 | A1* | 10/2015 | Carro | H04L 51/04 |
| | | | | 713/168 |
| 2016/0065719 | A1* | 3/2016 | Jeong | H04W 72/0473 |
| | | | | 455/420 |
| 2016/0247057 | A1* | 8/2016 | Lee | G06K 19/0727 |
| 2019/0268157 | A1* | 8/2019 | Wang | H04L 63/0861 |
| 2019/0279200 | A1* | 9/2019 | Govindarajan | G06Q 20/20 |
| 2019/0349196 | A1* | 11/2019 | Leedom | H04L 63/08 |
| 2019/0362336 | A1* | 11/2019 | Yim | G06Q 20/3272 |

FOREIGN PATENT DOCUMENTS

| | | | |
|---|---|---|---|
| KR | 10-2014-0111150 A | 9/2014 | |
| KR | 10-2015-0128633 A | 11/2015 | |
| KR | 10-2016-0065260 A | 6/2016 | |
| KR | 10-2017-0056562 A | 5/2017 | |
| WO | WO-2019136496 A1 * | 7/2019 | ............ G06F 21/32 |

OTHER PUBLICATIONS

S. Venkatesh and M. A. Dorairangaswamy, "Watermarking based audio secret writing method and secured image transmission," 2016 International Conference on Inventive Computation Technologies (ICICT), Coimbatore, India, 2016, pp. 1-10, doi: 10.1109/INVENTIVE. 2016.7830131. (Year: 2017).*
International Search Report dated Dec. 20, 2018 in corresponding International application No. PCT/KR2018/009527; 6 pages.
Notification of Reason for Refusal dated Dec. 18, 2017 in corresponding Korean application No. KR10-2017-0136567; 11 pages.
Decision of Patent Allowance dated Feb. 22, 2018 in corresponding Korean application No. KR10-2017-0136567; 5 pages.

* cited by examiner

Fig. 5

| Header Field | Data Field |
|---|---|
| Header information | Encryption key + card information request code |

Fig. 6

| Correction value | 3 | 2 | 1 | 0 | -1 | -2 | -3 |
|---|---|---|---|---|---|---|---|
| Correction frequency [Hz] | 18,065 | 18,070 | 18,075 | 18,080 | 18,085 | 18,090 | 18,095 |

Fig. 8

| Header Field | Data Field |
|---|---|
| Header information | Encryption key + card information |

SHORT-RANGE PAYMENT SYSTEM USING SOUND COMMUNICATION

FIELD

The present invention relates to a short-range payment system, and more specifically to a short-range payment system using sound communication, which enables magnetic field and RS communication payment by using sound communication.

BACKGROUND

Existing technology operates based on hardware contained inside specific smartphones, and can be thus used only in specific terminals provided by a specific hardware manufacturer.

As the mobile pay market using smartphones proliferates, various types of mobile pay apps are being provided, but they are causing considerable inconvenience to service because they cannot appropriately utilize existing offline infrastructures.

In order to overcome this problem, a data transmission method through contactless communication between a smartphone and an existing magnetic secure transmission (MST) payment terminal is being provided. However, this is not a perfect solution because the corresponding function can be used only in the specific terminals of a specific manufacturer.

Therefore, there is an urgent need for data transmission through contactless communication with MST payment terminals in all types of various terminals as well as the specific terminals of a specific manufacturer.

SUMMARY

An object of the present invention is to enable a smartphone to transmit and receive data to and from an existing magnetic secure transmission (MST) terminal, performing magnetic field (magnetic) security transmission, by using sound communication.

A short-range payment system according to an embodiment of the present invention may include: a user terminal configured to transmit and receive a card information sound wave signal, which is a sound wave signal including card information, during operation in payment mode; a magnetic field converter configured to, when receiving the card information sound wave signal, extract the card information from the card information sound wave signal and generate a magnetic field that matches the extracted card information; and an MST payment device configured to perform payment processing by using the magnetic field generated by the magnetic field converter.

When an object is detected within a preset proximity range, the magnetic field converter may transmit an awake sound wave signal, which is a sound wave signal requesting card information from the user terminal, over a first channel; and, when detecting the awake sound wave signal over the first channel, the user terminal may operate in payment mode, and may transmit the card information sound wave signal including the card information over a second channel.

The magnetic field converter may include: a proximity sensor configured to detect whether an object is present within the preset proximity range; an awake sound wave signal transmission unit configured to, when the user terminal is detected within the proximity range, request card information from the user terminal and transmit the awake sound wave signal having an encryption key over the first channel; a card information sound wave signal reception unit configured to receive the card information sound wave signal over the second channel different from the first channel; a card information extraction unit configured to extract the card information from the received card information sound wave signal; and a magnetic field generation unit configured to generate the magnetic field that matches the extracted card information.

The magnetic field converter may include an RS communication unit configured to transmit the extracted card information to the MST payment device via RS communication.

The awake sound wave signal transmission unit may include: an encryption key generation module configured to generate the encryption key; an awake sound wave data generation module configured to generate awake sound wave data including the encryption key and a card information request code; a converter speaker configured to output a sound wave signal; and an awake sound wave signal transmission module configured to load the awake sound wave signal, obtained by converting the awake sound wave data into a sound wave signal, into the first channel and to transmit the awake sound wave signal via the converter speaker.

When the card information sound wave signal is detected over the second channel, the awake sound wave signal transmission module may stop transmission of the awake sound wave signal over the second channel.

The card information sound wave signal reception unit may include: a converter microphone configured to receive the card information sound wave signal; a sound wave signal detection module configured to detect whether the card information sound wave signal is present over the second channel via the converter microphone; and a validity verification module configured to, when the card information sound wave signal is detected over the second channel, extract the encryption key from the card information sound wave signal over the second channel and verify validity of the encryption key. The card information extraction unit may extract the card information only from the card information sound wave signal the verification of the validity of which is successful, and may not extract the card information from the card information sound wave signal the verification of the validity of which fails.

When an object is detected within the proximity range, a converter microphone and the converter speaker that receive the card information sound wave signal may be activated; and, when an object is not detected within the proximity range, the converter microphone and the converter speaker may be deactivated.

The user terminal may include: a terminal microphone configured to receive the awake sound wave signal; a terminal speaker configured to output the card information sound wave signal; an encryption key extraction unit configured to, when the awake sound wave signal having the card information request code is received over the first channel, deactivate the terminal microphone and then extract the encryption key from the awake sound wave signal; a card information sound wave signal generation unit configured to generate the card information sound wave signal, which is a sound wave signal including the encryption key and the card information; and a card information sound wave signal transmission unit configured to load the card information sound wave signal into the second channel and to transmit the card information sound wave signal via the terminal speaker.

The encryption key may be a random symmetric encryption key.

According to an embodiment of the present invention, a data transmission method through contactless communication with MST payment terminals, which was used only in the specific terminals of a specific manufacturer, is drastically improved, and thus payment through smartphone contactless communication is enabled utilizing all existing card payment infrastructures, including MST-type credit card check terminals, POS payment devices, etc., without change regardless of the types of smartphones in existing shops, thereby increasing the convenience of the use of the smartphone payment of customers.

BRIEF DESCRIPTION OF THE DRAWINGS

FIG. 5 is a view showing an example of a frame of awake sound wave data according to an embodiment of the present invention;

FIG. 6 is a view showing an example of a correction table used during the transmission of a sound wave according to an embodiment of the present invention;

FIG. 8 is a view showing an example of a frame of card information sound wave data including an encryption key and card information according to an embodiment of the present invention.

DETAILED DESCRIPTION

In the following, the advantages and features of the present invention and methods for achieving the advantages and the features will be apparent from embodiments that will be described below in detail in conjunction with the accompanying drawings. However, the present invention is not limited to the embodiments disclosed below, but may be implemented in various different forms. The embodiments are provided to completely convey the scope of the invention to those having ordinary knowledge in the art to which the present invention pertains, and the present invention is defined only by the scopes of the claims. Furthermore, in the following description of the present invention, when it is determined that a related well-known technology or the like may make the gist of the present invention obscure, a detailed description thereof will be omitted.

Figure 1:
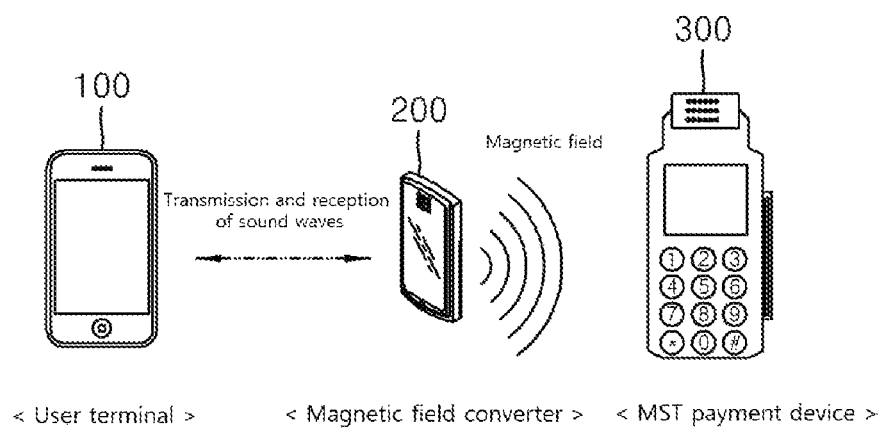
FIG. 1 is a view showing the configuration of an MST payment system using sound communication according to an embodiment of the present invention.
Figure 2:
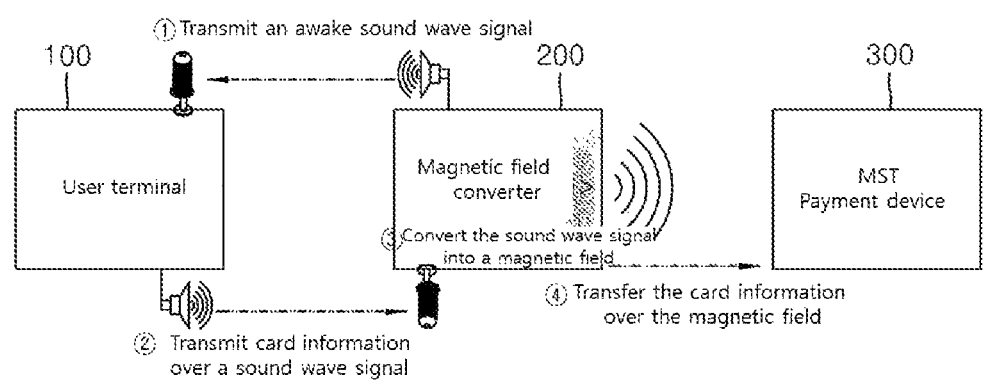
FIG. 2 is a view showing an example of the operation of the MST payment system according to the embodiment of the present invention.
Figure 3:
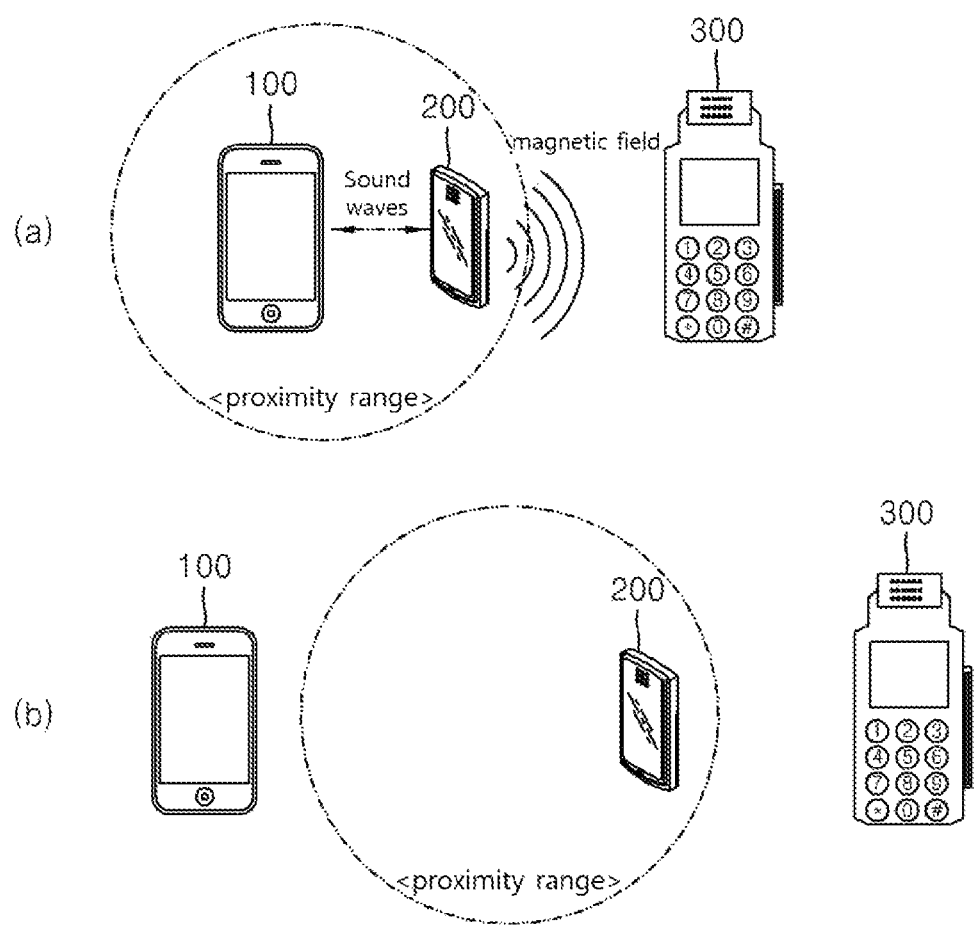
FIG. 3 is a view showing an example of the operation of a magnetic field converter based on whether a user terminal is proximate to the magnetic field converter according to the embodiment of the present invention.

FIG. 1 is a view showing the configuration of an MST payment system using sound communication according to an embodiment of the present invention, FIG. 2 is a view showing an example of the operation of the MST payment system according to the embodiment of the present invention, and FIG. 3 is a view showing an example of the operation of a magnetic field converter based on whether a user terminal is proximate to the magnetic field converter according to the embodiment of the present invention.

The MST payment system using sound communication according to the present invention enables payment through smartphone contactless communication by utilizing all existing card payment infrastructures, including MST-type credit card check terminals, POS payment devices, etc., without change regardless of the types of smartphones in existing shops.

For this purpose, the MST payment system of the present invention includes an MST payment device 300, a user terminal 100, and a magnetic field converter 200.

The MST payment device 300 is a terminal that performs payment processing by using a magnetic field generated by the magnetic field converter 200. In other words, the MST payment device 300 extracts card information by reading the magnetic field generated by the magnetic field converter 200, and utilizes the card information for payment processing.

The user terminal 100 is a terminal in which the information (a card number, a validity period, etc.) of a financial card, such as a credit card, a check card, or the like, of a user has been recorded. Although a smartphone is illustrated in the drawings as an example, not only a smartphone but also a tablet personal computer (PC), a slate PC, a portable multimedia player (PMP), etc. may correspond to the user terminal 100. It will be apparent that the terminal to which the present invention is applicable is not limited to the above-described type but may include all terminals that can communicate with an external device.

The user terminal 100 transmits a sound wave signal including card information (hereinafter referred to as the "card information sound wave signal") during operation in payment mode. In this case, the sound wave signal is a signal in the sound wave frequency band, e.g., a frequency band between 18,000 Hz and 19,800 Hz. A signal in the above frequency band is not a sound wave in an audible frequency band audible to humans, and is thus a signal having a frequency inaudible to humans. Accordingly, a card information sound wave signal including card information is transmitted using a signal in the frequency band of inaudible sound waves. This user terminal 100 will be described in greater detail later.

When receiving the card information sound wave signal from the user terminal 100, the magnetic field converter 200 extracts card information from the card information sound wave signal. Furthermore, the magnetic field converter 200 generates a magnetic field that matches the extracted card information.

Generally, magnetic secure transmission (MST), which is magnetic security transmission technology, is a method of performing payment by wirelessly transmitting magnetic credit card information. When a smartphone equipped with a device containing card information is touched to a credit card payment terminal, the MST payment device 300 automatically reads the card information and processes payment.

Accordingly, as shown in FIG. 2, the magnetic field converter 200 of the present invention receives the card information of a user from the user terminal 100 in the form of sound waves, extracts card information from the received sound waves, converts the card information into a magnetic field form, and outputs the magnetic field, thereby enabling the MST payment device 300 to read the card information via the magnetic field and process card payment. Accordingly, although only smartphones capable of generating a magnetic field could use the MST payment device 300 in the past, payment via the MST payment device 300 may be processed using all types of user terminals 100 when the magnetic field converter 200 of the present invention is provided.

Furthermore, the magnetic field converter 200 and the user terminal 100 allow the transmission and reception of sound waves to be performed over different channels, respectively. In other words, in order to avoid mutual interference, the transmission and reception of sound waves are allowed to be performed over two different channels, respectively.

For this purpose, when an object is detected within a preset proximity range, the magnetic field converter 200 transmits a sound wave signal (hereinafter referred to as the "awake sound wave signal") requesting card information from the user terminal 100 over a first channel. When detecting the awake sound wave signal over the first channel, the user terminal 100 operates in payment mode, and transmits a card information sound wave signal including card information over a second channel.

Furthermore, when the user terminal 100 is proximate and close to the magnetic field converter 200 within the proximity range, as shown in FIG. 3(a), the individual modules of the magnetic field converter 200 are operated. In contrast, when the user terminal 100 is moved away from the magnetic field converter 200 and out of the proximity range, as shown in FIG. 3(b), all the operations of the magnetic field converter 200 are stopped and then reset.

Figure 4:
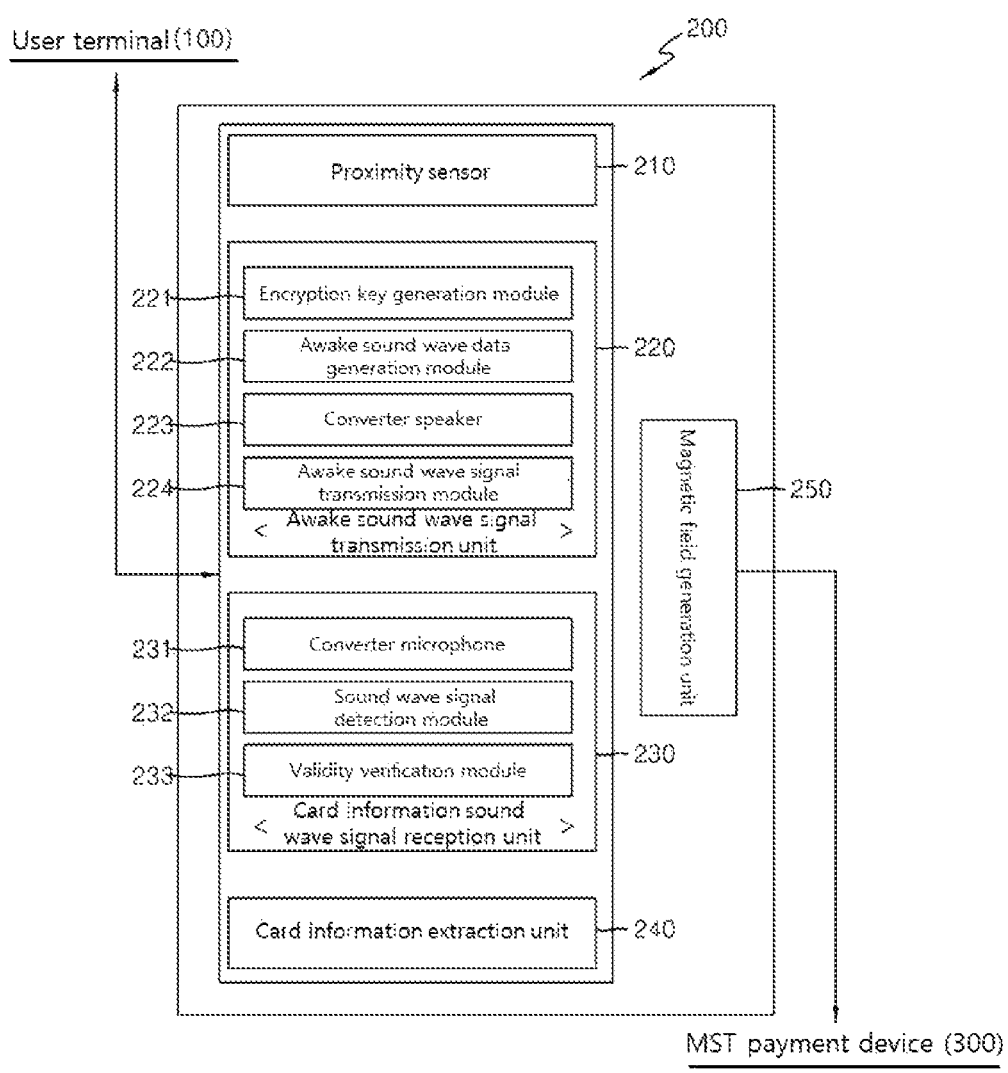
FIG. 4 is a block diagram showing the configuration of the magnetic field converter according to the embodiment of the present invention.

FIG. 4 is a block diagram showing the configuration of the magnetic field converter according to the embodiment of the present invention, FIG. 5 is a view showing an example of a frame of awake sound wave data according to an embodiment of the present invention, and FIG. 6 is a view showing an example of a correction table used during the transmission of a sound wave according to an embodiment of the present invention.

As shown in FIG. 4, the magnetic field converter 200 may include a proximity sensor 210, an awake sound wave signal transmission unit 220, a card information sound wave signal reception unit 230, a card information extraction unit 240, and a magnetic field generation unit 250. The magnetic field converter 200 may further include an RS communication unit (not shown).

The proximity sensor 210 is a sensor that detects whether an object is present within a preset proximity range. In this case, the object is based on a concept including all objects, such as a human, a thing, etc. Various sensors, such as a human body sensor, a laser sensor, an ultrasonic sensor, etc., may be used as the proximity sensor 210 as long as they have a small size and a desirable reception rate. The proximity sensor 210 always operates. When an object is not present near the proximity sensor 210, the proximity sensor enters an ON (waiting) state and all values are reset.

When the user terminal 100 is not detected within the proximity range, the awake sound wave signal transmission unit 220 transmits an awake sound wave signal having an encryption key over the first channel. For this purpose, the awake sound wave signal transmission unit 220 may include an encryption key generation module 221, an awake sound wave data generation module 222, a converter speaker 223, and an awake sound wave signal transmission module 224.

The encryption key generation module 221 is a module that generates an encryption key. In this case, the encryption key may be implemented as a random symmetric encryption key encrypted via random number symmetry. In this case, the random symmetric encryption key is an encryption key that is generated, for example, by generating a 20-digit random number and then applying the random number to a predetermined encryption algorithm.

The awake sound wave data generation module 222 is a module that generates awake sound wave data including an encryption key and a card information request code, as shown in FIG. 5. In this case, card information request code is code information requesting the user terminal 100 to provide card information, and is code information previously agreed with the user terminal 100.

The converter speaker 223 is a module through which a sound wave signal is output. When an object is detected within the proximity range, the converter speaker 223 is activated. In contrast, when an object is not detected within the proximity range, the converter speaker 223 is not activated. The reason for this is that there is no need to activate the converter speaker 223 when an object is not detected.

The awake sound wave signal transmission module 224 loads an awake sound wave signal, obtained by converting awake sound wave data into a sound wave signal, into the first channel, and transmits the awake sound wave signal via the converter speaker 223. As is well known, sound communication enables lower power communication than RF communication, such as Bluetooth. Sound communication uses binary frequency shift keying (BFSK) modification and continuous waveform (CW) modulation such as amplitude shift keying (ASK) in order to transmit data in the form of a sound wave signal. The BFSK modulation method is a method of allocating 0 and 1 to two specific frequency sound waves, respectively, and the CW modulation method is a method of allocating 1 to a target that maintains a sound having a specific or higher strength for a specific or longer time, and allocating 0 to a target that maintains a soundless state for a specific or longer time regardless of frequency. Communication using these modulation methods can transmit only one bit of data for a specific unit time by using two types of sound waves. Sound waves used in common mobile communication terminals have a considerably lower frequency than radio waves, and thus a unit time, which is a time used to distinguish a data stream to be transmitted, is considerably longer than that of radio waves. Accordingly, when only one bit is transmitted for the unit time by using only two types of sound waves, transmission speed must be low, and thus communication is performed using sound waves having various frequency sounds instead of the two types of sound waves. In other words, communication is performed by setting frequency sounds to pitch frequencies used in music, associating data digital values with the pitch frequencies, transmitting various frequency sounds, and performing decoding. By doing so, a plurality of bits is transmitted per unit time.

Furthermore, when the card information sound wave signal transmitted by the user terminal 100 is detected over the second channel, the awake sound wave signal transmission module 224 stops the transmission of an awake sound wave signal over the first channel. The reason for this is to stop the transmission of sound waves over the first channel in order to prevent the frequency error of the first and second channels when a card information sound wave signal is detected over the adjacent second channel.

Meanwhile, the card information sound wave signal reception unit 230 of the magnetic field converter 200 functions to receive a card information sound wave signal over the second channel. For this purpose, the card information sound wave signal reception unit 230 may include a converter microphone 231, a sound wave signal detection module 232, and a validity verification module 233.

The converter microphone 231 is a microphone that is provided in the magnetic field converter 200. The converter microphone 231 receives a card information sound wave signal. When an object is detected within the proximity range, the converter microphone 231 is activated. In contrast, when an object is not detected within the proximity range, the converter microphone 231 is not activated. The reason for this is that there is no need to activate the converter microphone 231 when an object is not detected.

The sound wave signal detection module functions to detect whether a card information sound wave signal is present over the second channel via the converter microphone 231.

The validity verification module 233 is a module that, when a card information sound wave signal is detected over the second channel, extracts an encryption key from the card information sound wave signal over the second channel and verifies the validity of the encryption key. The validity of the encryption key is verified by checking whether the encryption key matches the encryption key included in the awake sound wave signal transmitted by the awake sound wave signal transmission unit 220.

The card information extraction unit 240 extracts card information from the received card information sound wave signal. Furthermore, card information is extracted only from the card information sound wave signal the verification of the validity of which is successful, and does not extract card information from the card information sound wave signal the verification of the validity of which fails. The card information sound wave signal the verification of the validity of which fails is discarded without the extraction of card information.

The magnetic field generation unit 250 generates a magnetic field that matches the extracted card information. A magnetic field is generated by matching extracted card information to MST (magnetic secure transmission), which is magnetic security transmission technology.

The RS communication unit (not shown) transmits the extracted card information to the MST payment device 300 via RS communication. The RS communication unit directly transmits the card information of a user to the MST payment device 300 by using serial communication such as RS-232 and RS-484 and parallel communication. When necessary, the RS communication unit provides the card information via RS communication, other than a magnetic field, in a wired manner.

Meanwhile, although the magnetic field converter 200, including the proximity sensor 210, the awake sound wave signal transmission unit 220, the card information sound wave signal reception unit 230, the card information extraction unit 240, the magnetic field generation unit 250, and the RS communication unit (not shown), may be provided with drive power by a battery, the magnetic field converter 200 may include a separate USB cable, and may be provided with drive power by the MST payment device 300. The USB cable may be inserted into the USB port of the MST payment device 300, and drive power may be provided by the MST payment device 300.

Meanwhile, when the awake sound wave signal is transmitted, hardware characteristics need to be taken into account. In the communication of sound waves using binary or multiple bits, when sound waves are transmitted via a speaker, the sound waves may be loaded into a frequency having a slight error, other than an originally set reference frequency, due to the hardware characteristics of the speaker, and may be then transmitted. A microphone that receives the sound waves demodulates them at the originally set reference frequency, and thus a problem may occur in that accurate data may not be received, with the result that the hardware characteristics need to be taken into account. In other words, when sound waves are transmitted via the converter speaker 223, the sound waves may be loaded into a frequency having a slight error, other than an originally set reference frequency, due to the hardware characteristics of the speaker and the awake sound wave signal transmission module 224, and may be then transmitted. The microphone that receives the sound waves demodulates them at the originally set reference frequency, and thus accurate data may not be received.

Accordingly, the frequency band of the sound wave signal is determined by taking into account the hardware characteristics of the speaker and the awake sound wave signal transmission module 224. For this purpose, the separate correction table shown in FIG. 6 may be used.

The correction table is now described in greater detail. Each of the user terminal 100 and the magnetic field converter 200 has a hardware correction table in which a correction frequency band, in which correction frequencies are allocated for respective correction values adapted to correct errors attributable to the hardware characteristics of the magnetic field converter 200, is set and a correction reference frequency is allocated to the correction value "0."

The magnetic field converter 200 that transmits an awake sound wave signal generates data frequencies, allocated to data digits, at a set base decibel level, generates separate reception filter frequencies, used to receive data loaded into a sound wave signal transmitted from the nearest location when a sound wave signal is received, at the base decibel level, and generates a correction reference frequency, adapted to perform hardware transmission correction, at the base decibel level.

The user terminal 100 that receives an awake sound wave signal receives an awake sound wave signal, extracts decibels for respective data frequencies, arrays the decibels, corrects the array by shifting the array by a correction value extracted using the hardware correction table, extracts a number of decibels of data frequencies equal to the number of array factors, allocated to the highest decibel separate reception filter frequencies in a band of separate reception filter frequencies, in descending order, and then restores data.

As shown in FIG. 6, the hardware correction table is a memory table in which a correction frequency band, to which correction frequencies are allocated, is set for individual correction values adapted to correct error attributable to the hardware characteristics of the magnetic field converter 200 transmitting an awake sound wave signal and a correction reference frequency is allocated to the correction value "0." When a sound wave signal is transmitted, sound waves may be loaded into a frequency having a slight error, other than an originally set reference frequency, due to the hardware characteristics of a speaker and are then transmitted. In order to correct the error attributable to the hardware characteristics, the same hardware correction table is provided in each of the magnetic field converter 200 and the user terminal 100. The correction frequency allocated to the correction value "0" is referred to as a correction reference frequency.

Referring to FIG. 6, it can be seen that a correction frequency band may range from 18,065 to 18,095 Hz, correction frequencies may be allocated at intervals of 5 Hz, a correction value of 3 may be provided at 18,065 Hz, a correction value of 2 may be provided at 18,070 Hz, a correction value of 1 may be provided at 18,075 Hz, a correction value of 0 may be provided at 18,080 Hz, a correction value of −1 may be provided at 18,085 Hz, a correction value of −2 may be provided at 18,090 Hz, and a correction value of −3 may be provided at 18,095 Hz. Accordingly, 18,080 Hz having a correction value of 0 corresponds to a correction reference frequency. Therefore, the magnetic field converter 200 that transmits an awake sound wave signal selects a correction frequency for hardware transmission correction as a hardware characteristic error correction means, and performs transmission at the base decibel level. A more detailed description of the transmission and reception of sound waves using such a correction table has been given in Korean Patent No. 10-1568314 issued to the present applicant.

Figure 7:
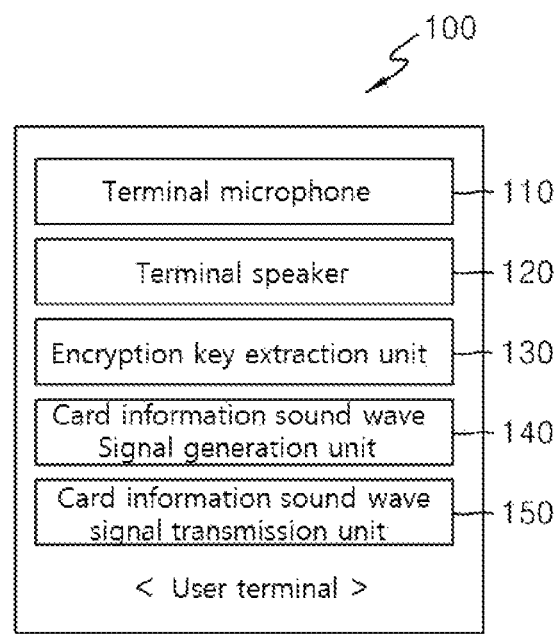
FIG. 7 is a block diagram showing the configuration of a user terminal according to an embodiment of the present invention.

FIG. 7 is a block diagram showing the configuration of a user terminal according to an embodiment of the present invention, and FIG. 8 is a view showing an example of a frame of card information sound wave data including an encryption key and card information according to an embodiment of the present invention.

When the user terminal 100 operates in payment mode, the user terminal 100 transmits a card information sound wave signal, which is a sound wave signal including card information. For this purpose, as shown in FIG. 7, the user terminal 100 may include a terminal microphone 110, a terminal speaker 120, an encryption key extraction unit 130, a card information sound wave signal generation unit 140, and a card information sound wave signal transmission unit 150.

The terminal microphone 110 is a microphone that is provided in the user terminal 100. The terminal microphone 110 functions to receive an awake sound wave signal.

The terminal speaker 120 is a speaker that is provided in the user terminal 100. The terminal speaker 120 functions to output a card information sound wave signal.

The encryption key extraction unit 130 functions to, when an awake sound wave signal having a card information request code is received over the first channel, activate the terminal microphone 110 and then extract an encryption key from the awake sound wave signal.

The card information sound wave signal generation unit 140 generates card information sound wave data including an encryption key and card information, as shown in FIG. 8, and generates card information sound wave data into a card information sound wave signal, which is a sound wave signal. In order to transmit data in the form of a sound wave signal, BFSK (binary frequency shift keying) modulation and CW (continuous waveform) modulation, such as ASK (amplitude shift keying), may be used.

The card information sound wave signal transmission unit 150 loads the card information sound wave signal into the second channel, and transmits the card information sound wave signal via the terminal speaker 120. Accordingly, the converter microphone 231 of the magnetic field converter 200 receives the card information sound wave signal and converts the card information sound wave signal into a magnetic field form, thereby enabling payment via a magnetic field to be processed in the MST payment device 300.

The embodiments in the above-described description of the present invention are selected from among various practicable examples as preferred examples, and are then proposed. The technical spirit of the present invention is not necessarily limited and restricted by the embodiments, but various alterations and modifications and other equivalent embodiments may be made without departing from the technical spirit of the present invention.

The invention claimed is:

1. A short-range payment system using sound communication, the short-range payment system comprising:
a user terminal configured to
receive an awake sound wave signal over a first channel, the awake sound wave signal including an encryption key,
initiate a payment mode of the user terminal upon receiving the awake sound wave signal, and
transmit a card information sound wave signal over a second channel different from the first channel upon receiving the awake sound wave signal, the card information sound wave signal including an encryption key and card information, and the card information sound wave signal being transmitted during operation in the payment mode;
a magnetic field converter configured to, upon receiving the card information sound wave signal from the user terminal over the second channel,
extract the encryption key from the card information sound wave signal,
extract the card information from the card information sound wave signal only when validity of the extracted encryption key is verified, and
generate a magnetic field that matches the extracted card information; and
an MST payment device configured to perform payment processing by using the magnetic field generated by the magnetic field converter,
wherein the magnetic field converter comprises:
a proximity sensor configured to detect whether the user terminal is present within a preset proximity range;
an awake sound wave signal transmission unit configured to, upon detecting the user terminal within the preset proximity range, request the card information from the user terminal by transmitting the awake sound wave signal having the encryption key over the first channel;
a card information sound wave signal reception unit configured to receive the card information sound wave signal having the encryption key over the second channel;
a card information extraction unit configured to extract the card information from the received card information sound wave signal; and
a magnetic field generation unit configured to generate the magnetic field that matches the extracted card information,
wherein the awake sound wave signal transmission unit comprises an encryption key generation module configured to generate the encryption key,
wherein the card information sound wave signal reception unit comprises a validity verification module configured to extract the encryption key from the card information sound wave signal received over the second channel in order to verify validity of the encryption key,
wherein the card information extraction unit extracts the card information from the card information sound wave signal only when the validity of the extracted encryption key is verified as matching the transmitted encryption key of the awake sound wave signal, and the card information extraction unit does not extract the card information from the card information sound wave signal when the validity of the extracted encryption key is not verified, and wherein the awake sound wave signal transmission unit, the card information sound wave signal reception unit, the card information extraction unit, the magnetic field generation unit, the encryption key generation module, and the validity verification module are each implemented via at least one processor.

2. The short-range payment system of claim 1, wherein the magnetic field converter further comprises an RS communication unit configured to transmit the extracted card information to the MST payment device via RS communication, wherein the RS communication unit is implemented via at least one processor.

3. The short-range payment system of claim 1, wherein the awake sound wave signal transmission unit comprises:

an awake sound wave data generation module configured to generate awake sound wave data including the encryption key and a card information request code; and a converter speaker configured to output a sound wave signal, wherein the awake sound wave data generation module is implemented via at least one processor.

4. The short-range payment system of claim 3, wherein:

when an object is detected within the preset proximity range, a converter microphone and the converter speaker that receive the card information sound wave signal are activated; and when an object is not detected within the preset proximity range, the converter microphone and the converter speaker are deactivated.

5. The short-range payment system of claim 3, wherein the user terminal comprises:

a terminal microphone configured to receive the awake sound wave signal;

a terminal speaker configured to output the card information sound wave signal;

an encryption key extraction unit configured to, when the awake sound wave signal having the card information request code is received over the first channel, deactivate the terminal microphone and then extract the encryption key from the awake sound wave signal;

a card information sound wave signal generation unit configured to generate the card information sound wave signal, which is a sound wave signal including the encryption key and the card information; and a card information sound wave signal transmission unit configured to load the card information sound wave signal into the second channel and to transmit the card information sound wave signal via the terminal speaker, wherein the encryption key extraction unit, the card information sound wave signal generation unit, and the card information sound wave signal transmission unit are each implemented via at least one processor.

6. The short-range payment system of claim 3, wherein the encryption key is a random symmetric encryption key.

* * * * *